(12) United States Patent
Beber et al.

(10) Patent No.: US 8,677,895 B2
(45) Date of Patent: *Mar. 25, 2014

(54) FOOD PROCESSOR WITH DICING ELEMENT

(75) Inventors: Kevin J. Beber, Granger, IN (US); John Colasanti, Coopersville, MI (US); Arren J. McCormick, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 1197 days.

This patent is subject to a terminal disclaimer.

(21) Appl. No.: 12/553,303

(22) Filed: Sep. 3, 2009

(65) Prior Publication Data

US 2010/0154660 A1 Jun. 24, 2010

Related U.S. Application Data

(63) Continuation-in-part of application No. 12/339,290, filed on Dec. 19, 2008, now Pat. No. 8,122,820.

(51) Int. Cl.
*A23N 4/04* (2006.01)
*A47J 17/00* (2006.01)

(52) U.S. Cl.
USPC ............ 99/537; 99/348; 99/509; 99/510; 99/511; 30/124; 30/299; 30/303; 30/305; 83/663; 83/857; 83/932; 241/92; 241/101.1; 241/169.1; 241/282.1; 366/129; 366/200; 366/312; 366/343

(58) Field of Classification Search
CPC ............................. A47J 43/04; A47J 43/0711
USPC .............. 34/124, 299, 303, 305; 83/663, 932, 83/857; 99/509–511, 348, 537; 241/92, 241/101.1, 282.1, 169.1; 366/129, 200, 366/312, 343; 30/124, 299, 303, 305
See application file for complete search history.

(56) References Cited

U.S. PATENT DOCUMENTS

| | | | | |
|---|---|---|---|---|
| 1,449,040 | A * | 3/1923 | Hany | 83/425.1 |
| 2,226,317 | A * | 12/1940 | Myers | 241/166 |
| 2,227,098 | A * | 12/1940 | Maclean | 99/512 |
| 2,953,853 | A * | 9/1960 | Tieman | 83/57 |
| 3,085,607 | A | 4/1963 | Schottle | |
| 3,519,048 | A * | 7/1970 | Reifenhauser | 83/168 |
| 3,664,396 | A | 5/1972 | Tremblay | |
| 3,985,304 | A * | 10/1976 | Sontheimer | 241/92 |
| 4,134,205 | A * | 1/1979 | Heling | 30/287 |
| D251,231 | S * | 3/1979 | Hashimoto | D7/384 |
| 4,145,941 | A * | 3/1979 | Davis | 83/167 |
| D254,161 | S * | 2/1980 | Verdun | D7/384 |
| 4,190,208 | A | 2/1980 | Schaeffer et al. | |

(Continued)

FOREIGN PATENT DOCUMENTS

FR 2548573 A1 * 1/1985

*Primary Examiner* — Dana Ross
*Assistant Examiner* — Brett Spurlock

(57) ABSTRACT

A food processor defining a food processing path comprises a frame having a first compartment located within the food processing path and a second compartment located out of the food processing path and at least one dicing element configured to be received in both of the first and second compartments. When the dicing element is received in the first compartment, the dicing element dices food passing through the food processing path, and when the dicing element is received in the second compartment, the dicing element is stored out of the food processing path.

23 Claims, 11 Drawing Sheets

(56) References Cited

U.S. PATENT DOCUMENTS

| | | | |
|---|---|---|---|
| 4,199,112 A * | 4/1980 | McLean | 241/92 |
| 4,256,265 A * | 3/1981 | Madan | 241/92 |
| 4,300,429 A * | 11/1981 | Brown et al. | 83/651.1 |
| 4,346,634 A * | 8/1982 | Jones | 83/431 |
| 4,369,680 A * | 1/1983 | Williams | 83/13 |
| 4,387,860 A * | 6/1983 | Necas et al. | 241/282.1 |
| 4,406,603 A * | 9/1983 | Williams | 425/191 |
| 4,439,124 A * | 3/1984 | Watanabe | 425/112 |
| 4,456,185 A * | 6/1984 | Ribassin et al. | 241/92 |
| 4,560,111 A * | 12/1985 | Cavalli | 241/92 |
| 4,572,443 A * | 2/1986 | Coleman | 241/166 |
| 4,579,028 A * | 4/1986 | Neidhardt | 83/109 |
| 4,588,136 A * | 5/1986 | Homma | 241/95 |
| 4,799,626 A * | 1/1989 | Hickel et al. | 241/37.5 |
| 4,877,191 A * | 10/1989 | Golob et al. | 241/92 |
| 4,955,271 A * | 9/1990 | Boutin-Lester | 83/404.3 |
| 5,207,137 A * | 5/1993 | Baril | 83/167 |
| 5,216,031 A * | 6/1993 | Dobson et al. | 99/538 |
| 5,245,902 A * | 9/1993 | Pereira | 83/435.19 |
| 5,271,317 A * | 12/1993 | Aguerrevere et al. | 99/538 |
| 5,379,954 A * | 1/1995 | Funke | 241/101.2 |
| 5,445,332 A * | 8/1995 | Shimizu et al. | 241/100 |
| 5,662,033 A * | 9/1997 | Yawman | 99/538 |
| D395,573 S * | 6/1998 | Leverrier | D7/381 |
| 5,832,804 A * | 11/1998 | Dudley et al. | 83/870 |
| 5,947,016 A * | 9/1999 | Repac et al. | 99/538 |
| 6,035,771 A * | 3/2000 | Conran et al. | 99/510 |
| D426,423 S * | 6/2000 | Lee | D7/384 |
| 6,209,439 B1 | 4/2001 | Repac et al. | |
| D445,299 S * | 7/2001 | Spagnolo et al. | D7/384 |
| D445,636 S * | 7/2001 | Spagnolo | D7/384 |
| 6,364,226 B1 * | 4/2002 | Kubicko | 241/36 |
| 6,467,948 B1 * | 10/2002 | Lawson | 366/314 |
| 6,539,847 B2 * | 4/2003 | Wong | 99/492 |
| 6,732,622 B2 * | 5/2004 | Vincent | 83/247 |
| 6,945,486 B2 * | 9/2005 | Teng | 241/169.1 |
| 7,137,581 B2 * | 11/2006 | Takayama et al. | 241/169.1 |
| D539,080 S * | 3/2007 | Zhiwen et al. | D7/384 |
| 7,191,691 B2 * | 3/2007 | Kaposi | 83/167 |
| D547,601 S * | 7/2007 | Ting et al. | D7/384 |
| 7,263,926 B2 * | 9/2007 | Chang Chien | 99/510 |
| 7,455,006 B2 * | 11/2008 | Toth | 83/698.41 |
| 7,681,495 B2 * | 3/2010 | Wan et al. | 99/495 |
| 7,762,169 B2 * | 7/2010 | Kaposi | 83/167 |
| 7,866,243 B2 * | 1/2011 | DiPietro | 83/856 |
| 7,866,259 B2 * | 1/2011 | Zaghloul et al. | 99/495 |
| 7,946,222 B2 * | 5/2011 | Webb | 99/349 |
| 7,975,948 B2 * | 7/2011 | Holcomb et al. | 241/169.1 |
| 7,984,667 B2 * | 7/2011 | Freudinger | 83/620 |
| 8,002,774 B2 * | 8/2011 | Burmeister et al. | 606/79 |
| 8,051,769 B2 * | 11/2011 | Conti et al. | 99/537 |
| 8,122,820 B2 * | 2/2012 | Conti et al. | 99/509 |
| 8,250,959 B2 * | 8/2012 | Beber et al. | 83/857 |
| 2004/0055437 A1 * | 3/2004 | Engdahl | 83/597 |
| 2004/0060414 A1 * | 4/2004 | Sundqvist | 83/663 |
| 2005/0207273 A1 * | 9/2005 | Newman et al. | 366/314 |
| 2006/0150830 A1 * | 7/2006 | Chang | 99/510 |
| 2007/0006739 A1 * | 1/2007 | Fevre | 99/348 |
| 2007/0095189 A1 * | 5/2007 | Williams | 83/651.1 |
| 2007/0194032 A1 * | 8/2007 | Leung et al. | 220/912 |
| 2007/0252024 A1 * | 11/2007 | Barraclough | 241/92 |
| 2008/0082416 A1 * | 4/2008 | Kotas et al. | 705/14 |
| 2008/0098866 A1 | 5/2008 | DiPietro | |
| 2008/0111011 A1 * | 5/2008 | Wang | 241/37.5 |
| 2008/0156913 A1 * | 7/2008 | Orent | 241/37.5 |
| 2008/0163768 A1 * | 7/2008 | Glucksman et al. | 99/537 |

* cited by examiner

FOOD PROCESSOR WITH DICING ELEMENT

CROSS REFERENCE TO RELATED APPLICATIONS

This application is a continuation-in-part of U.S. patent application Ser. No. 12/339,290, filed Dec. 19, 2008, which issued as U.S. Pat. No. 8,122,820 on Feb. 28, 2012, from which this application claims priority and which is incorporated herein by reference in full.

BACKGROUND OF THE INVENTION

Food processors are used to prepare food items by conducting a processing operation, such as slicing, dicing, grating, or shredding, on the food item. Each processing operation is conducted by a different processing tool, which must be replaced when switching between each processing operation. The processing tool is also switched when different size food items are desired for the same processing operation. Most processing tools have sharp blades or edges that must be accounted for during handling.

In addition, handling the processing tools can be difficult to do in a sanitary manner because it is difficult to handle the processing tool without touching the parts of the processing tool that come into contact with the food item. When the food processing operation is complete, some food may remain within parts of the processing tool. This food may be difficult to remove during a normal washing procedure.

SUMMARY OF THE INVENTION

A food processor defining a food processing path comprises a frame having a first compartment located within the food processing path and a second compartment located out of the food processing path and at least one dicing element configured to be received in both of the first and second compartments having multiple elements defining multiple dicing openings through which food may pass. When the dicing element is received in the first compartment, the dicing element dices food passing through the food processing path, and when the dicing element is received in the second compartment, the dicing element is stored out of the food processing path.

DESCRIPTION OF THE EMBODIMENTS OF THE INVENTION

Figure 1:
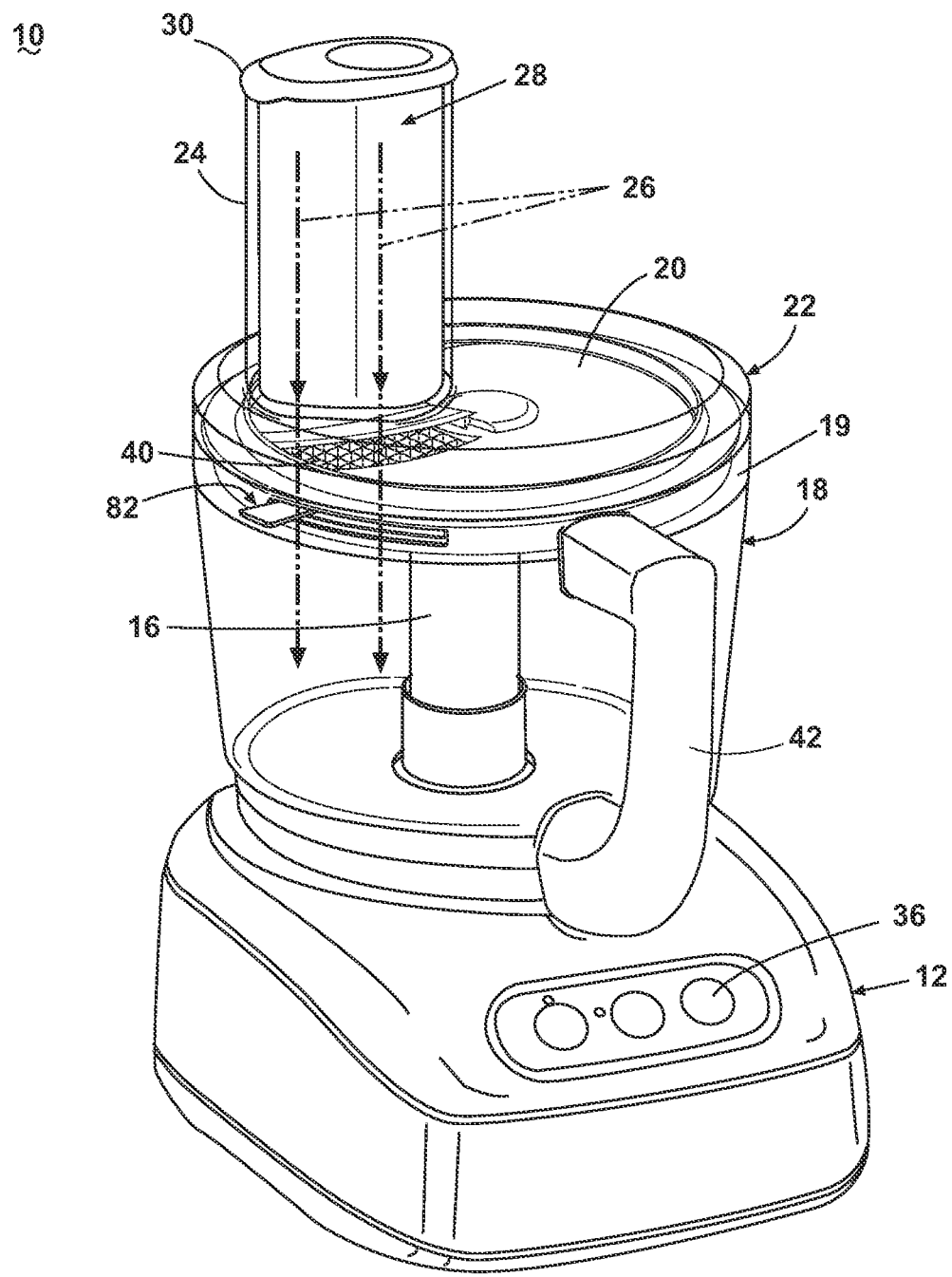
FIG. 1 is a perspective view of a food processor according to a first embodiment of the invention.

Referring now to the figures, FIG. 1 illustrates a food processor 10 according to one embodiment of the invention. The food processor 10 shares many features of a conventional food processor, which will not be described in detail herein except as necessary for a complete understanding of the invention. The food processor 10 includes a base 12 of the food processor 10. The base 12 may include a motor 14 (FIG. 2) having an output shaft 16. A receptacle or a bowl 18 for receiving the processed food, usually made of transparent plastic is supported on the base. The bowl 18 terminates in an open top defined by a lip 19.

A removable lid 22 may be removably received on the bowl 18. Thus, the bowl 18 may be closed by the lid 22, which may be removably secured to the bowl 18 by a snap-fit, a twist-lock arrangement, or any other suitable means of attachment. The bowl 18 and lid 22 may collectively form a food processing chamber. A feed tube 24 extends upwardly from the lid 22. A food pusher 28 may be sized to slide through the feed tube 24 and may be used to push food items through the feed tube 24. A stop, in the form of a flange 30, is provided on the food pusher 28 to limit the insertion of the food pusher 28 into the feed tube 24. The bowl 18 and lid 22 are illustrated as being transparent, but they need not be.

The bowl 18, lid 22, and feed tube 24 may be collectively referred to as a housing into which the food is introduced and processed. It is also possible for the base 12 to be a part of the housing. However, in the illustrated embodiment, the housing is supported by the base 12.

A cutting tool 20 and dicing tool 40 may be located within the housing. As illustrated, the cutting tool 20 may be supported on the output shaft 16 and the dicing tool 40 may be supported by the bowl 18, such as by press-fitting into the open top of the bowl 18. For the purposes of this description, the term "dicing" is used to refer to any process in which food is cut or divided into multiple components. Non-limiting examples including cutting the food into cubes, long, thin strips (also known as julienne) or any other polyhedral or cylindrical shape. The food may be cut by the dicing tool 40 in combination with the cutting tool 20 such that the processed food has the same dimension along all three x, y and z axes, such as when food is cubed. Alternatively, the food can be cut by the dicing tool 40 and cutting tool 20 such that at least one of the dimensions is different from the other two dimensions, such as may be desirable when making French fries, for example, where the food is processed into square-shaped strips.

Figure 2:
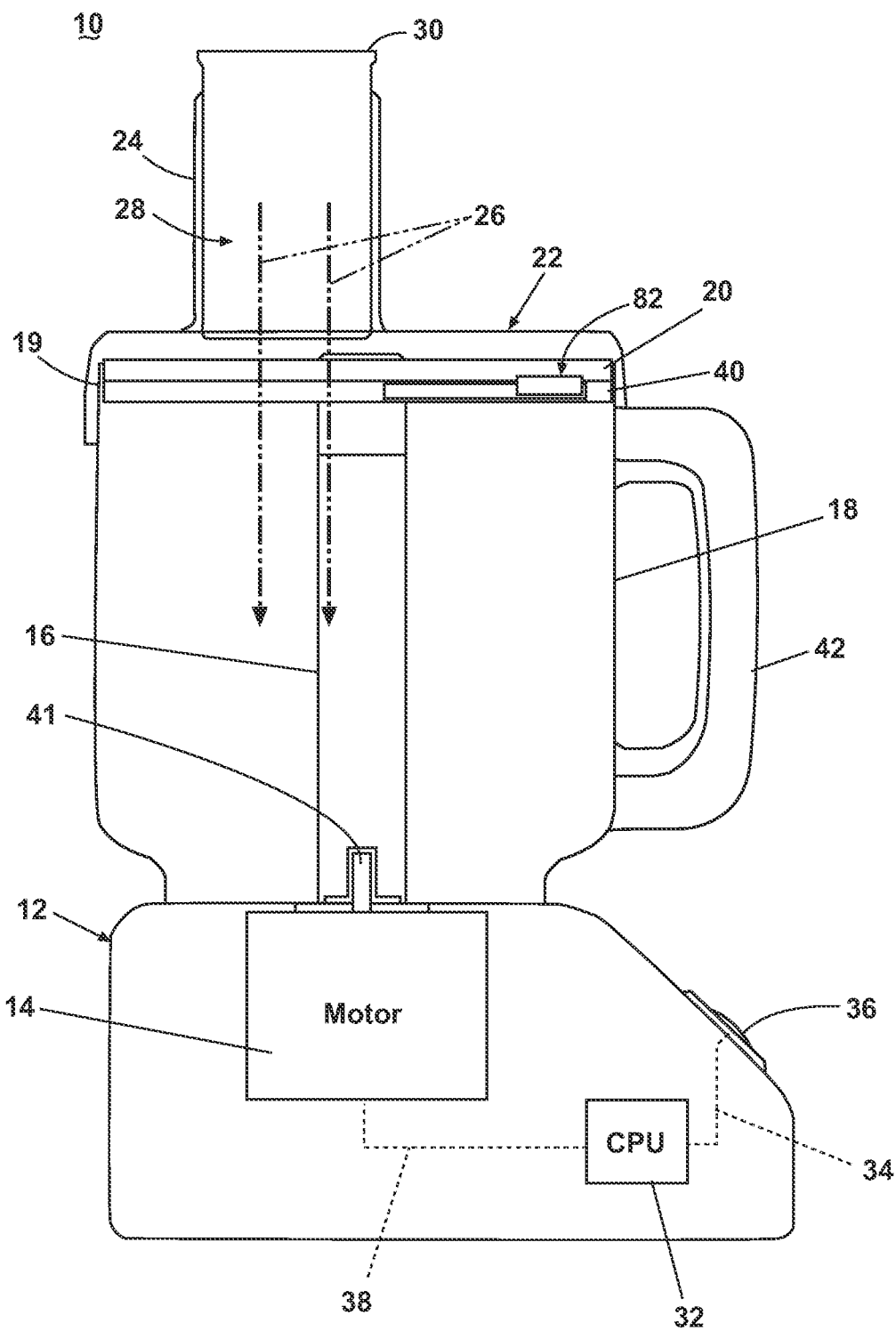
FIG. 2 is a schematic view of the food processor of FIG. 1 illustrating a food processing path through the food processor and its relationship with a cutting tool and dicing tool.

Referring to FIG. 2, a food processing path 26, illustrated by the spaced, dashed line, extends through the housing. The feed tube 24 forms an inlet to and part of the food processing path 26. In this case, the lid 22 and feed tube 24 act as a food guide or a food chute configured to receive food for processing. The food processing path 26 extends from the feed tube 24 through the cutting tool 20 and a portion of the dicing tool 40. The food processing path 26 ends when the processed food is deposited in the bowl 18.

A control system may be provided for controlling the operation of the food processor 10. The control system as illustrated includes a controller 32, which is electrically coupled through a user interface lead 34 to a user interface or control panel 36. The control panel 36 may be provided on the base 12 and may include operational controls such as dials, lights, switches, and displays enabling a user to control the operation of the food processor 10. The motor 14 may be electrically coupled through a control lead 38 to the controller 32. The food processor 10 may be preprogrammed with a number of different food processing options from which a user may select a food processing option to process a food item.

Figure 3:
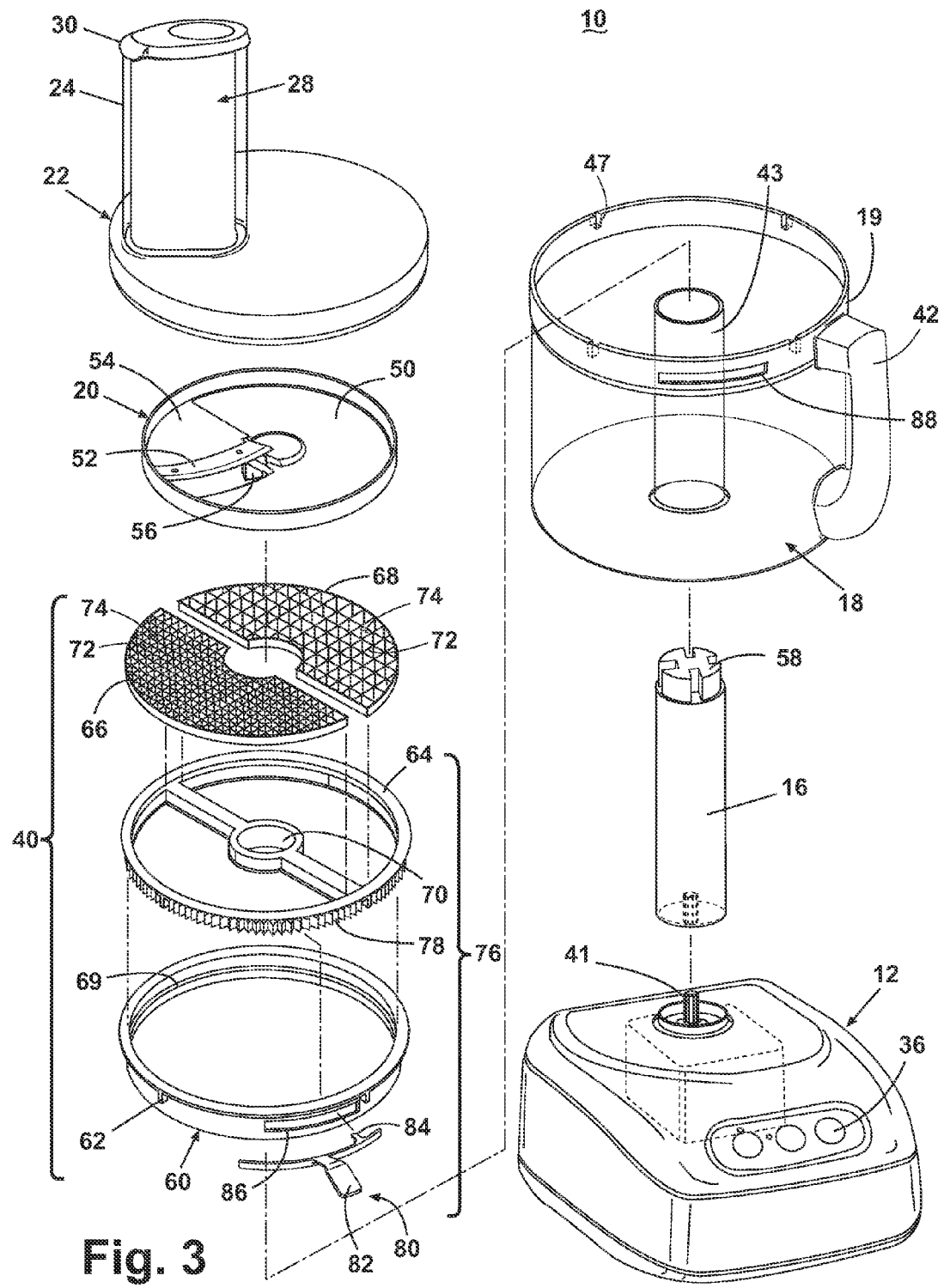
FIG. 3 is an exploded view of the food processor of FIG. 1.

With reference to FIG. 3, the different elements of the food processor 10 will be described in greater detail. A drive shaft 41 extends from the base 12. The drive shaft 41 is operably coupled with the motor 14, and may be used to provide rotational movement to the output shaft 16 that extends into the food processing chamber formed by the bowl 18 and the lid 22.

A handle 42 is provided on the bowl 18 so that a user may more easily maneuver the bowl 18. A guide 43 projects into the bowl 18. The output shaft 16 is received within the guide 43. The bowl 18 may be secured onto the base 12 and around the output shaft 16 by a snap-fit, a twist lock arrangement, or any other suitable means of attachment. The bowl 18 may further be provided with a plurality of keyways 47 in the lip 19 of the bowl 18.

The cutting tool 20 is illustrated as being a rotatable cutting disc having a planar portion 50. A cutting blade 52 is provided above the planar portion 50 and acts to cut food as the cutting tool 20 is rotated through the food processing path 26. A ramp portion 54 slopes from the cutting blade 52 to the planar portion 50. The ramp portion 54 acts to push the cut food through the dicing tool 40 after it has been cut by the cutting tool 20. The cutting tool 20 and cutting blade 52 may be made of metal or any other suitable material. Other cutting tools, especially non-disc-shaped cutting tools may be used.

The cutting tool 20 may be operably coupled to the output shaft 16 above the dicing tool 40. The cutting tool 20 has a hub 56 that is complimentarily keyed to mate with an upper end 58 of the output shaft 16 such that rotation of the output shaft 16 will rotate the cutting tool 20. The cutting tool 20 is selectively movable through the food processing path 26 and the cutting blade 52 acts to cut food as it passes through the food processing path 26.

The dicing tool 40 may include a frame 60 having keys 62, a rotatable body 64, and multiple dicing elements 66, 68 carried by the rotatable body 64. The frame 60 is a ring frame having keys 62 that locate the dicing tool 40 within the bowl 18. The keys 62 may be received by the keyways 47 in the lip 19 of the bowl 18 for securing the frame 60 to the bowl 18. The frame 60 may also have a channel 69 on its inner surface.

The rotatable body 64 of the dicing tool 40 is a disc with first and second dicing elements 66, 68 formed in it and a central portion 70 capable of receiving the output shaft 16. It is contemplated that the dicing tool 40 may have more than two dicing elements. Each dicing element will typically have different processing functionality.

The first and second dicing elements 66, 68 are illustrated as grids removably mounted in the rotatable body 64 and having intersecting cutting elements 72 defining openings 74. As illustrated, the first dicing element 66 has smaller openings 74 and has a processing capability of finely dicing a food item. The second dicing element 68 has larger openings 74 and has a processing capability of cubing a food item. The openings 74 may be of any shape including circular or oval. Alternatively, the dicing tool 40 may have alternative functions or have another processing capability on the same tool. The first and second dicing elements 66, 68 may be made of metal or any material suitable for processing food items.

The dicing tool 40 may also include a drive mechanism 76 coupled to the dicing tool 40 to selectively move the first and second dicing elements 66, 68 relative to the frame 60 to selectively move the first and second dicing elements 66, 68 through the food processing path 26. The drive mechanism 76 as illustrated is a ratchet mechanism formed by a series of teeth 78 projecting from the outer edge of the rotatable body 64 and a pawl 80. The manually-actuable lever or pawl 80 includes a handle 82 and a finger 84 for engaging the teeth 78. The finger 84 operably couples the pawl 80 to the rotatable body 64. The finger 84 selectively engages the teeth 78 formed along the outer edge of the rotatable body 64. With this configuration, the ratchet mechanism may be operated to provide the user with the ability to control which functionality of the dicing tool 40, in this case either the first dicing element 66 or the second dicing element 68, is located in the food processing path 26. Thus, the multiple dicing elements 66, 68 are selectively movable under the feed tube 24 and through the food processing path 26.

The pawl 80 may extend through a first space 86 in the frame 60 and a second space 88 in the bowl 18 such that the user may access the handle 82 and may move and align the desired portion of the dicing tool 40 under the feed tube 24. The rotatable body 64 may be rotatably mounted in the channel 69 and operably coupled to the pawl 80. The output shaft 16 may go through the central portion 70 of the dicing tool 40 and the dicing tool 40 may be received within the lip 19 of the bowl 18. The keys 62, and corresponding keyways 47 on the bowl 18, locate the dicing tool 40 within the bowl 18. More specifically, at least a portion of the frame 60 is press-fit against the lip 19. Alternatively, the dicing tool 40 may be mounted to the lid 22.

Regarding the operation of the food processor 10, after the bowl 18 is positioned on the base 12 and the drive shaft 41 and output shaft 16 are coupled, a user may place the dicing tool 40 within the lip 19 of the bowl 18 by placing it over the upper end 58 of the output shaft 16. The user may then place the cutting tool 20 on the upper end 58 of the output shaft 16. The user may then position the lid 22 on the bowl 18 and deliver food through the feed tube 24 into the bowl 18.

The user may then activate the motor 14 causing the drive shaft 41, output shaft 16, and cutting tool 20 to rotate. The food may be pushed down to the cutting tool 20 using the food pusher 28 where the food then contacts the cutting blade 52, at which point it is sliced and then it is pushed by the ramp portion 54 through the dicing tool 40 and into the bowl 18. Depending on which of the first and second dicing elements 66, 68 of the dicing tool 40 are in the food processing path 26, the dicing tool 40 may yield diced or cubed bits of food.

The dicing tool 40 and first and second dicing elements 66, 68 are selectively movable through the food processing path 26, between the cutting tool 20 and the bowl 18, to dice the food cut by the cutting tool 20. A user may change which dicing element is in the food processing path by operating the pawl 80.

Figure 4:
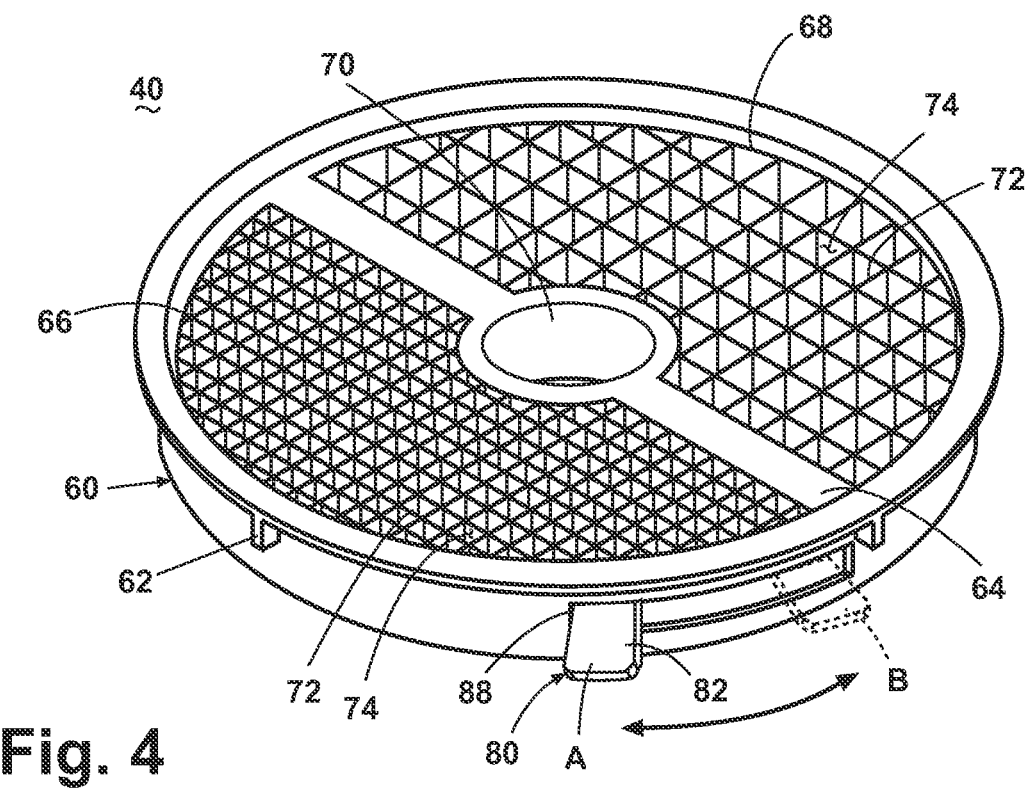
FIG. 4 is a partial perspective view of the dicing tool of the food processor of FIG. 1
Figure 5:
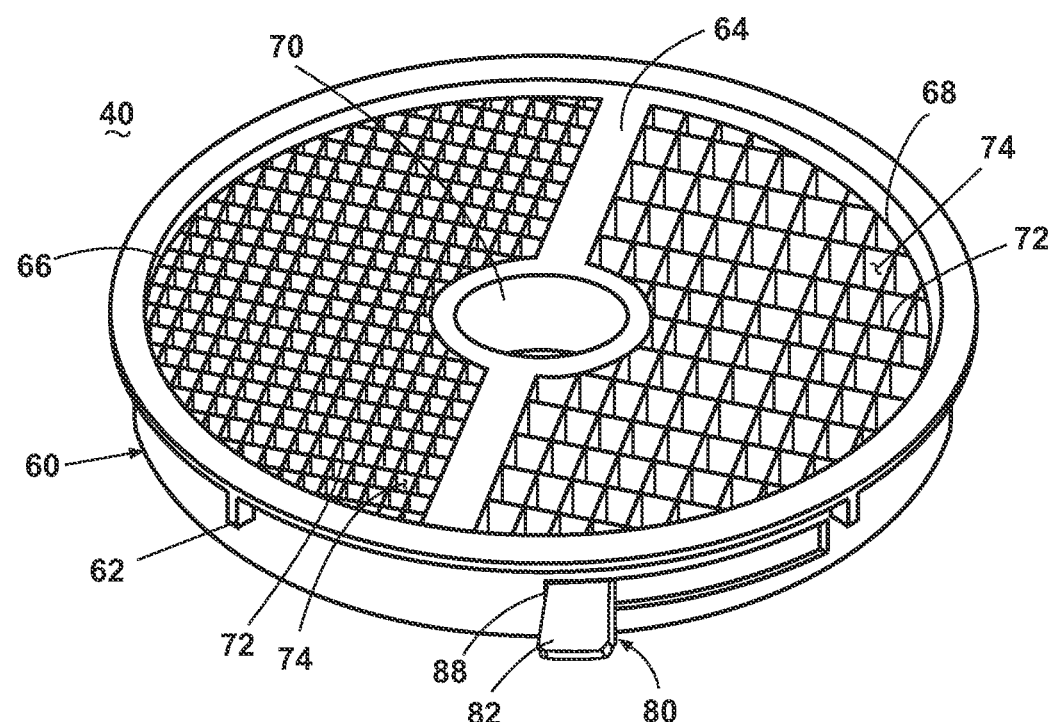
FIG. 5 is a second partial perspective view of the dicing tool of the food processor of FIG. 1

FIG. 4 illustrates the range of motion for the handle 82 of the ratchet mechanism to effect the selective movement of the first and second dicing elements 66, 68 through the food processing path 26. A user may manually move the handle 82 from a first position A to a second position B (shown in phantom). When the handle 82 is moved to the second position B, the resilient nature of the finger 84 and its orientation causes the finger 84 to be drawn up and over several of the teeth 78 on the rotatable body 64 without resulting in the rotation of the rotatable body 64. As the finger 84 is moved to position B the resilient nature of the finger 84 causes it to catch against one of the teeth 78. As the pawl 80 is moved back to position A the finger 84, still caught against one of the teeth 78, causes the rotatable body 64 to rotate with the pawl 80 to the position shown in FIG. 5.

As can easily be seen, the handle 82 of the pawl 80 has only a predetermined range of motion between position A and position B. The range of motion is indexed relative to the first and second dicing elements 66, 68 to effect a sixty degree change of the positioning of the dicing elements 66, 68 within the food processing path 26. Thus, for the illustrated embodiment, to change from the first dicing element 66 in the food processing path 26 to the second dicing element 68 in the food processing path 26 the pawl 80 must be manually-actuated to the full extent of its range three times by the user. However, depending on the number and/or size of the dicing elements and the range of travel of the lever, the number of manual actuations will vary. For convenience of the user, it is contemplated that the range of travel of the lever will be an integer multiple of the degree of rotation needed to move the dicing element into the processing path to effect an indexing relationship therebetween.

Figure 6:
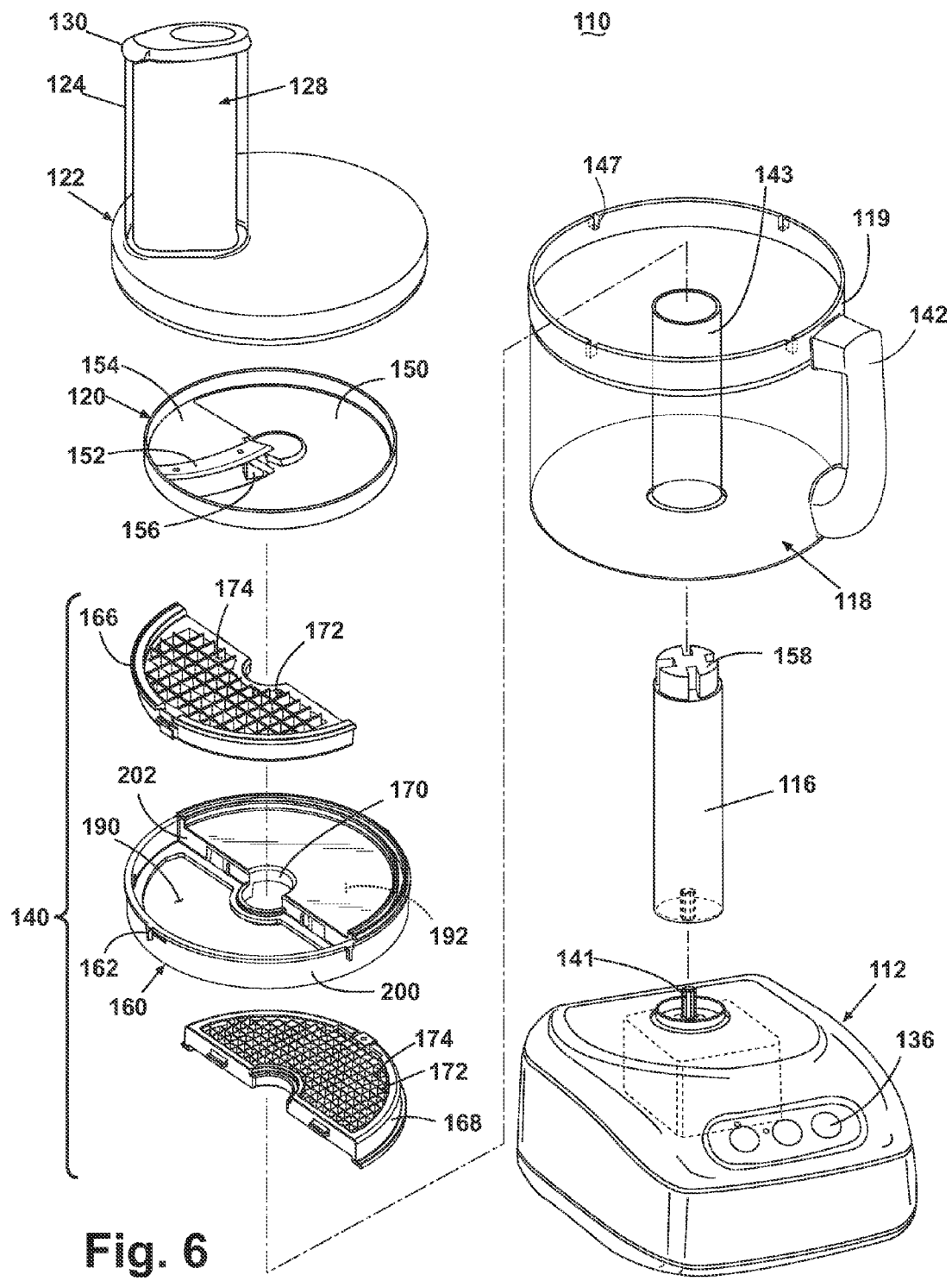
FIG. 6 is an exploded view of a food processor according to a second embodiment of the invention.

FIG. 6 is a schematic view of a food processor 110 having a dicing tool 140 according to a second embodiment of the invention. The second embodiment 110 is similar to the first embodiment 10, except in the manner in which a first and second dicing element 166, 168 are moved into a food processing path 126. Therefore, like parts will be identified with like numerals increased by 100, with it being understood that the description of the like parts of the first embodiment applies to the second embodiment, unless otherwise noted.

The food processor 110 includes a bowl 118, a lid 122 and a feed tube 124 which may be collectively referred to as a housing into which food is introduced and processed similar to the food processor 10 as described according to the first embodiment. A cutting tool 120 and a dicing tool 140 may be located within the housing. The cutting tool 120 may be supported on an output shaft 116 and the dicing tool 140 may be supported by the bowl 118, such as by press-fitting into the open top of the bowl 118.

The cutting tool 120 is illustrated as a rotatable cutting disc having a planar portion 150. A cutting blade 152 is provided above the planar portion 150 and acts to cut food as the cutting tool 120 is rotated through a food processing path 126 extending from the feed tube 124 through the cutting tool 120 and a portion of the dicing tool 140 and into the bowl 118. A ramp portion 154 slopes from the cutting blade 152 to the planar portion 150. The ramp portion 154 acts to push the cut food through the dicing tool 140 after it has been cut by the cutting tool 120. The cutting tool 120 and cutting blade 152 may be made of metal or any other suitable material.

The cutting tool 120 may be operably coupled to the output shaft 116 above the dicing tool 140 by a hub 156 that is complimentarily keyed to mate with an upper end 158 of the output shaft 116 such that rotation of the output shaft 116 will rotate the cutting tool 120. The cutting tool 120 is selectively movable through the food processing path 126 and the cutting blade 152 acts to cut food as it passes through the food processing path 126.

The dicing tool 140 may include a frame 160 having keys 162 and first and second compartments 190 and 192 on opposite sides of a central portion 170 of the frame 160 which is capable of receiving the output shaft 116. The dicing tool 140 may also include selectively removable first and second dicing elements 166 and 168, respectively that are sized to be received by both the first and second compartments 190 and 192. While the dicing tool 140 is described as having two dicing elements, it is within the scope of the invention for the dicing tool 140 to have any number of dicing elements.

Figure 7:
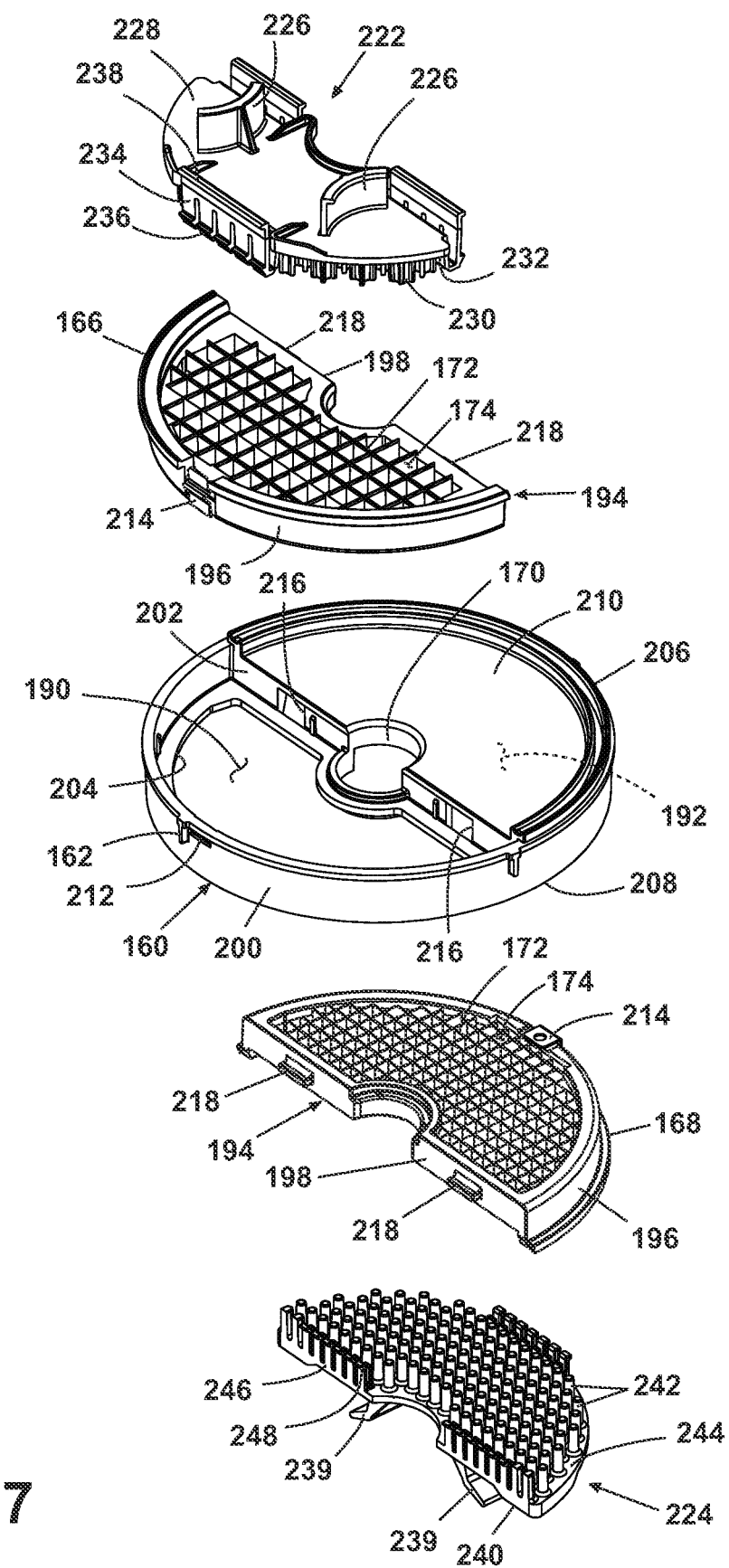
FIG. 7 is an exploded view of a dicing element and first and second management tools according to a third embodiment of the invention.

Referring now to FIG. 7, the dicing tool 140 is described in detail in combination with management tools 222 and 224. Each of the first and second dicing elements 166, 168 may include a housing 194 having a first, generally arcuate outer portion 196 and a second, generally straight inner portion 198 between which intersecting cutting elements 172 defining openings 174 extend. As illustrated, the first dicing element 166 may have larger openings 174 so as to have a processing capability of cubing a food item. The second dicing element 168 may have smaller openings 174 than the first dicing element 166 for finely dicing a food item. The openings 174 may be of any regular or irregular shape including circular or oval. The openings 174 of the first dicing elements 166 may have the same or different size and shape as those of the second dicing element 168. It is also within the scope of the invention for the openings 174 to be defined by non-intersecting, parallel cutting elements such that the food item is sliced as it passes through the first or second dicing elements 166 and 168. The cutting elements 172 may be made of metal or any material suitable for processing food. The cutting elements 172 may be sharp or have one or more sharpened edges for facilitating processing food.

The first and second dicing elements 166 and 168 may have a similar processing capability or different processing capabilities. For example, both the first and second dicing elements 166, 168 may have intersecting cutting elements such that the food is processed into different cube sizes. In another example, the first dicing element 166 may have intersecting cutting elements 172 for processing the food into cubes while the second dicing element 168 has non-intersecting cutting elements for processing the food into slices.

The first and second compartments 190 and 192 may be defined by a peripheral wall 200 of the frame 160 and a generally centrally located interior wall 202. The interior wall 202 may extend from one side of the frame 160 to a second side of the frame 160 directly opposite the first side, which is interrupted by the central portion 170 through which the output shaft 116 extends when the frame 160 is assembled with the food processor 110. The frame 160 may further comprise a ledge 204 extending from the peripheral wall 200 and the interior wall 202 partially into the first compartment 190 such that an opening to the first compartment 190 on a first side 206 of the frame 160 is larger than an opening to the first compartment 190 on a second side 208. In this manner, during a food processing operation, food in the food processing path 126 may pass from the feed tube 124 through the cutting tool 120 and the first compartment 190 of the dicing tool 140 and into the bowl 118. The second compartment 192 may have a barrier wall 210 extending between the peripheral wall 200 and the interior wall 202, blocking access to the second compartment 192 from the first side 206 of the frame 160.

The second compartment 192 is not part of the food processing path 126 and therefore does not need to be open such that food may pass through. However, it is within the scope of the invention for the barrier wall 210 to only partially obstruct access to the second compartment 192. The barrier wall 210 may serve as an indicator to a user that the second compartment 192 is not part of the food processing path 126. An alternative method for indicating that the second compartment 192 is not part of the food processing path may include limiting the manner in which the frame 160 may be placed on the bowl 118, by varying the number and/or location of the keys 162 and keyways 147 such that when the frame 160 is coupled with the bowl 118 only the first compartment 190 is in the food processing path 126.

The peripheral wall 200 may include a first aperture 212 in both the first and second compartments 190, 192 for receiving a resilient detent 214 located on the outer portion 196 of the housing 194 when the first and second dicing elements 166, 168 are placed in the first and second compartments 190, 192. The interior wall 202 may also include a pair of second apertures 216 for receiving a pair of retaining lugs 218 projecting from the inner portion 198 of the dicing element housing 194 when the first and second dicing elements 166, 168 are placed in the first and second compartments 190 and 192. As can best be seen in FIG. 10, the interior wall 202 may also include a pair of retaining tabs 220 projecting from a bottom edge of the interior wall 202 partially into the second compartment 192 for securing either the first or second dicing element 166, 168 when it is placed in the second compartment 192.

Still referring to FIG. 7, the first and second dicing elements 166, 168 may further be provided with selectively removable first and second management tools 222 and 224, respectively. The first and second management tools 222 and 224 may be used to remove food remaining within the dicing openings after a food processing operation and to facilitate handling of the dicing elements 166 and 168.

Figure 8A:
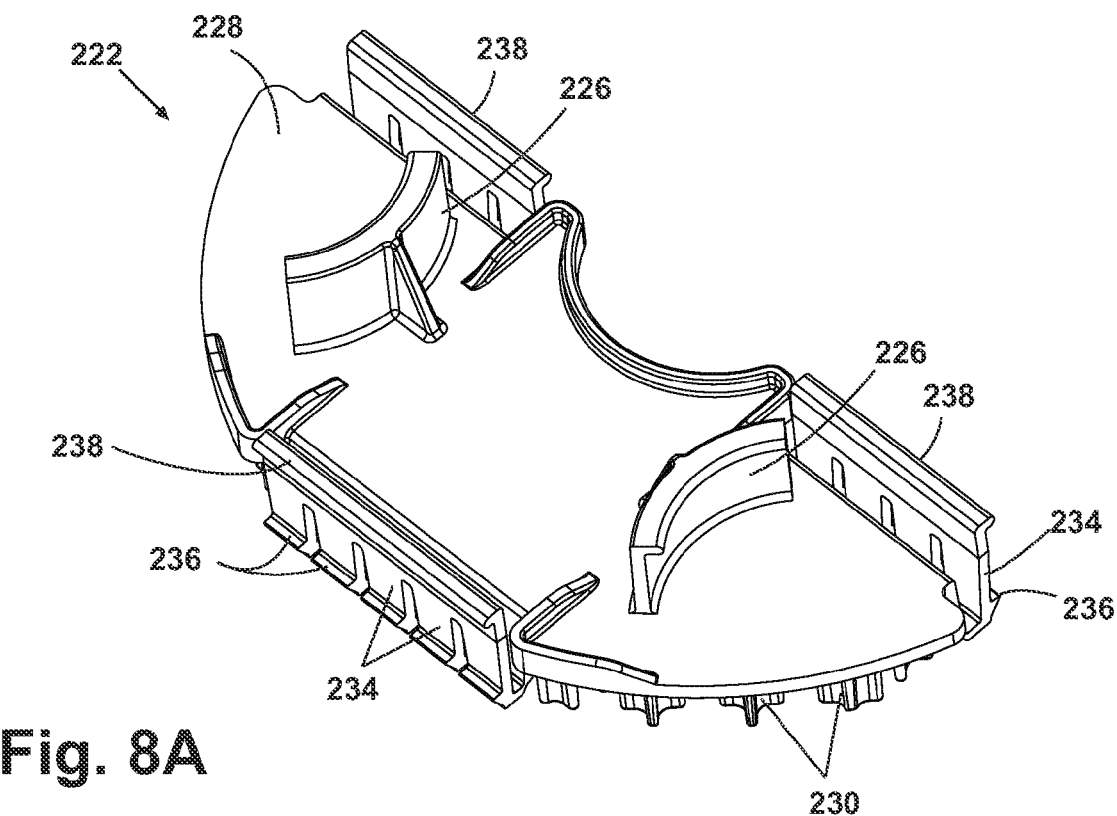
FIG. 8A is a top-down perspective view of the first carrier of FIG. 7.
Figure 8B:
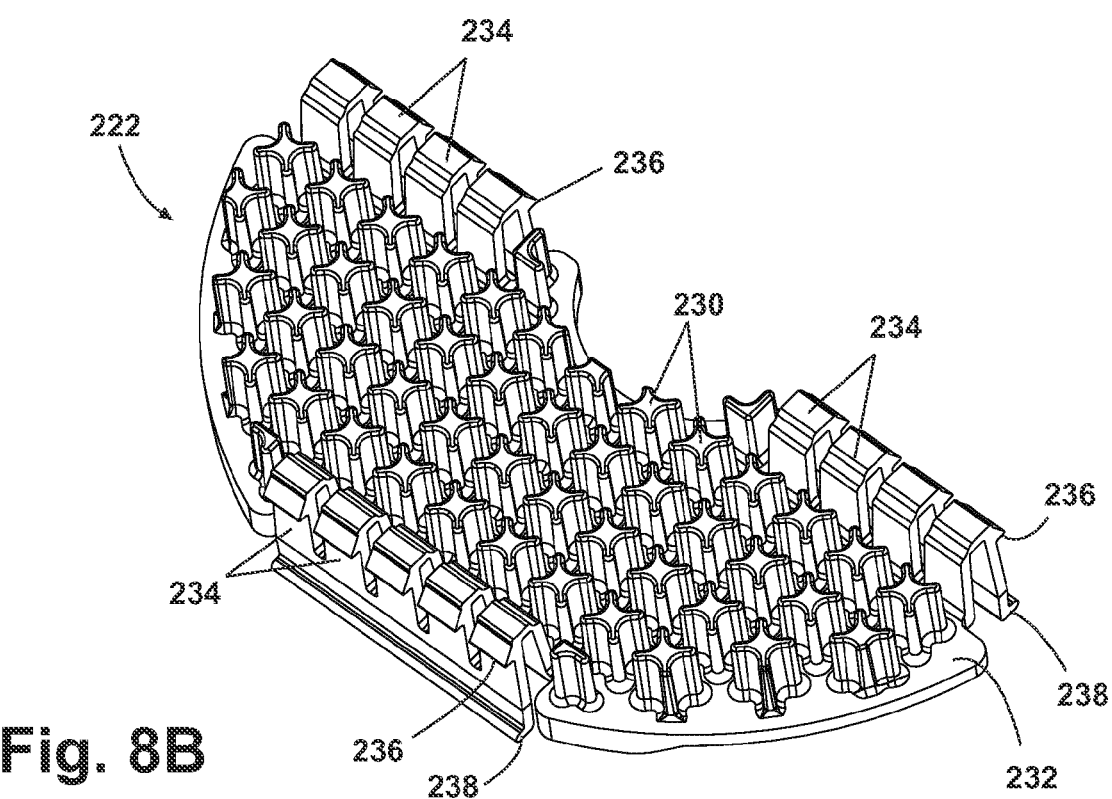
FIG. 8B is a bottom perspective view of the first carrier of FIG. 7.

Referring now to FIGS. 8A and 8B, the first management tool 222 has a pair of handles 226 in the form of a pair of fingers projecting from a first face 228 of the first management tool 222 and a plurality of projections 230 extending from a second face 232. The handles 226 may be spaced apart on the first face 228 such that a user can grasp the handles 226 with one hand for handling the first management tool 222. While the handles 226 are illustrated as projecting fingers, any suitable type of handle may be used without deviating from the scope of the invention. For example, the handles 226 may be in the form of one or more hooks or loops.

The projections 230 may be sized so as to be received within the dicing openings 174 of the first dicing element 166 for removing food that may remain within the dicing openings 174 after a food processing operation. The projections 230 may have a length equal to or greater than a depth of the cutting elements 172 which define the dicing openings 174, although it is also within the scope of the invention for the projections 230 to extend only partially through the dicing openings 174. While some of the projections 230 are illustrated as having an X-shaped cross-section, the projections 230 may have any shape and size suitable for being received within the dicing openings 174. The projections 230 may all have the same size and shape. Alternatively, the size and shape of the projections 230 may vary depending on their location on the management tool 222.

Figure 10:
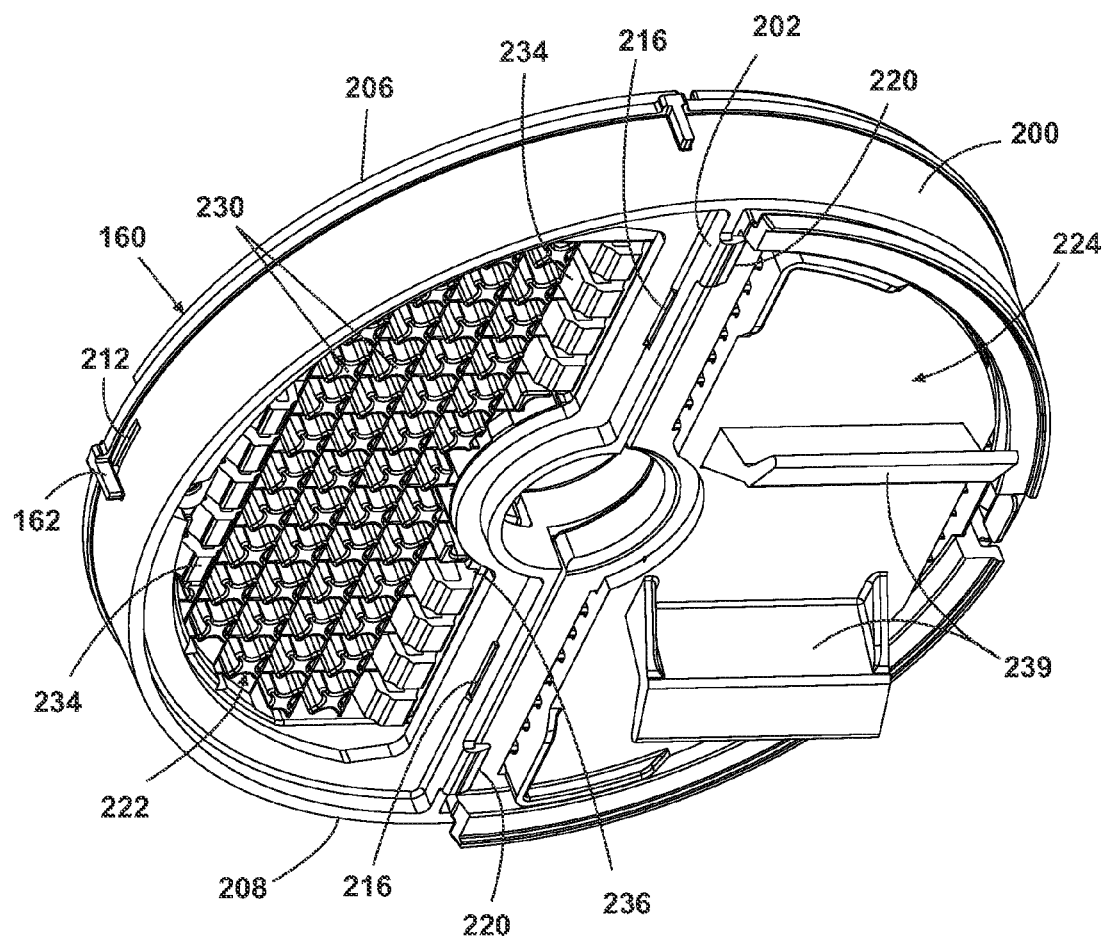
FIG. 10 is a perspective view of an assembled dicing element and first and second management tools according to the third embodiment of the invention.

Some of the projections 230 extending around at least a portion of the periphery of the first management tool 222 may have a U-shaped cross-section wherein at least one of the legs of the U-shaped projection is in the form of a resilient coupling element 234. The coupling elements 234 may include a finger 236, for engaging the housing 194 of the first dicing element 166 when the first management tool 222 is coupled with the first dicing element 166. The coupling elements 234 may be resilient such that they are depressed from an initial, extended position as the finger 236 passes into and through the dicing openings 174 and then snap back to the extended position when the finger 236 exits the dicing openings 174. When the first management tool 222 is coupled with the first dicing element 166, the finger 236 engages the housing 194 when the coupling elements 234 are in their extended position (FIG. 10). Adjacent coupling elements 234 may be connected by a tab 238 extending at least partially above the first face 228 for selectively and simultaneously flexing the coupling elements 234 during insertion and/or removal of the first management tool 222. Flexing the coupling elements 234 facilitates moving the finger 236 from a position in which it is engaging the housing 194 when the first management tool 222 and the first dicing element 166 are coupled, to a position in which the finger 236 is no longer engaging the housing 194 for removal of the first management tool 222. In this manner, the coupling elements 234 removably couple the first management tool 222 to the first dicing element 166 such that the first dicing element 166 may be handled through the first management tool 222.

While the coupling elements 234 are described as resiliently coupling the first management tool 222 with the first dicing element 166 through a snap-fit connection with the finger 236, the coupling elements 234 may also couple the first management tool 222 with the first dicing element 166 through a press-fit connection in which at least some of the projections 230 are press-fit into the dicing openings 174. In this case, the coupling element 234 may be in the form of a resilient material and project from one or more projections 230 such that the overall dimension of the projection 230 is slightly larger than the dimensions of the dicing openings 174. Alternatively, at least some of the projections 230 may be made entirely of a resilient material and have dimensions larger than the dicing openings 174 for press-fitting with the dicing openings 174. In another example, all of the projections 230 of the first management tool 222 may couple with the first dicing element 166 through a press-fit connection.

Figure 9A:
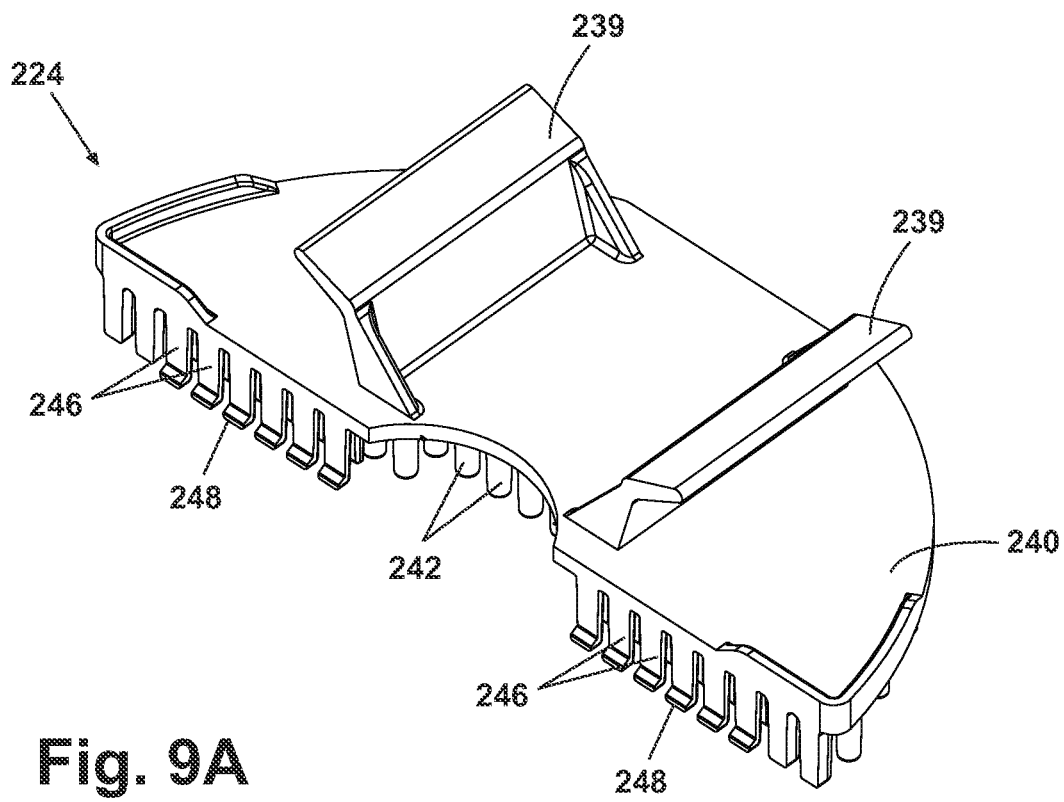
FIG. 9A is a top-down perspective view of the second carrier of FIG. 7.
Figure 9B:
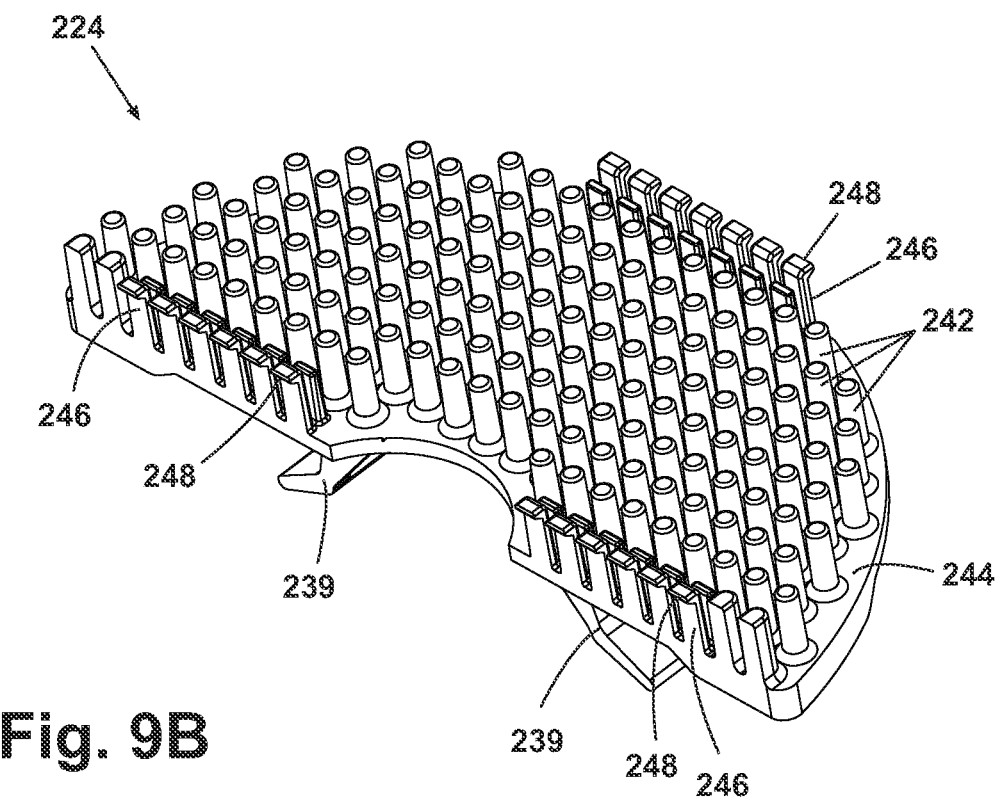
FIG. 9B is a bottom perspective view of the second carrier of FIG. 7.

Referring now to FIGS. 9A and 9B, the second management tool 224 is similar to the first management tool 222 and includes a pair of handles 239 projecting from a first face 240 of the second management tool 224 for grasping by a user during handling of the second management tool 224. The second management tool 224 may also include a plurality of projections 242 extending from a second face 244 of the second management tool 222 for removing food that may remain within the dicing openings 174 after processing food. As discussed above with reference to the first management tool 222, the projections 242 may have any suitable size and shape so as to be received by the dicing openings 174 when the second management tool 224 is coupled with the second dicing element 168. As illustrated in FIGS. 9A and 9B, at least some of the projections 242 of the second management tool 224 have a generally circular cross-section.

Some of the projections 242 extending around at least a portion of the periphery of the second management tool 224 may be in the form of a resilient coupling element 246. The coupling elements 246 may include a finger 248 for engaging the housing 194 of the second dicing element 168 when the second management tool 224 is coupled with the second dicing element 168. The second management tool 224 may be coupled with the second dicing element 168 through a snap-fit connection with the coupling element 246 having the finger 248. Alternatively, similar to the first management tool 222, the second management tool 224 may be coupled with the second dicing element 168 through a press-fit connection.

While the first and second management tools 222 and 224 are described as having coupling elements 230 and 246, respectively, for coupling with the first and second dicing elements 166 and 168, other methods for coupling may also be used without deviating from the scope of the invention. For example, a dicing element may have a housing partially extending above the cutting elements which defines an area in which a management tool may be press-fit. In another example, a dicing element may have one or more latches that may be selectively coupled with an upper face of a management tool to releasably couple the management tool and the dicing element.

The projections 230 and 242 of the first and second management tools 222, 224 may be made from any suitable rigid, semi-rigid or resilient material. For example, the projections 230 and 242 may be made from a rigid dishwasher-safe polymeric material for pushing food out of the dicing openings 174. In another example, the projections 230 and 242 may be made entirely of resilient dishwasher-safe material such as a resilient polymer. In yet another example, the projections 230 and 242 may include a core structure made from a rigid material and an exterior portion comprising a flexible or resilient material such as a series of brush bristles or flexible flaps. The coupling elements 234 and 246 may be made from the same material as the projections 230 and 242 or a different material. For example, the projections 230 and 242 may be made from a rigid plastic while the coupling elements 234, 246 are made from a resilient polymer. In yet another example, the coupling elements 234, 246 may be coupled with a rigid projection through a living hinge.

While the invention has been described in the context of a first and second management tool 222 and 224 for use with the first and second dicing elements 166 and 168, respectively, it is within the scope of the invention for a single, interchangeable management tool to be used that can be removably coupled with multiple dicing elements 166, 168. It is also within the scope of the invention for the second management tool 224 to be identical to the first management tool 222, varying only in the size and shape of the projections 230, 242. Similarly, it is within the scope of the invention for the first management tool 222 to be identical to the second management tool 224, varying only in the size and shape of the projections 230, 242.

As illustrated in FIG. 10, the dicing tool 140 comprising the first and second dicing elements 166, 168 and the first and second management tools 222, 224 may be coupled together as a single unit for storage, handling and cleaning of the first and second dicing elements 166, 168. Both the first and second management tool 222, 224 may be coupled with the first and second dicing elements 166, 168, respectively, regardless of which of the first and second compartments 190, 192 the dicing elements 166, 168 are located.

Figure 11:
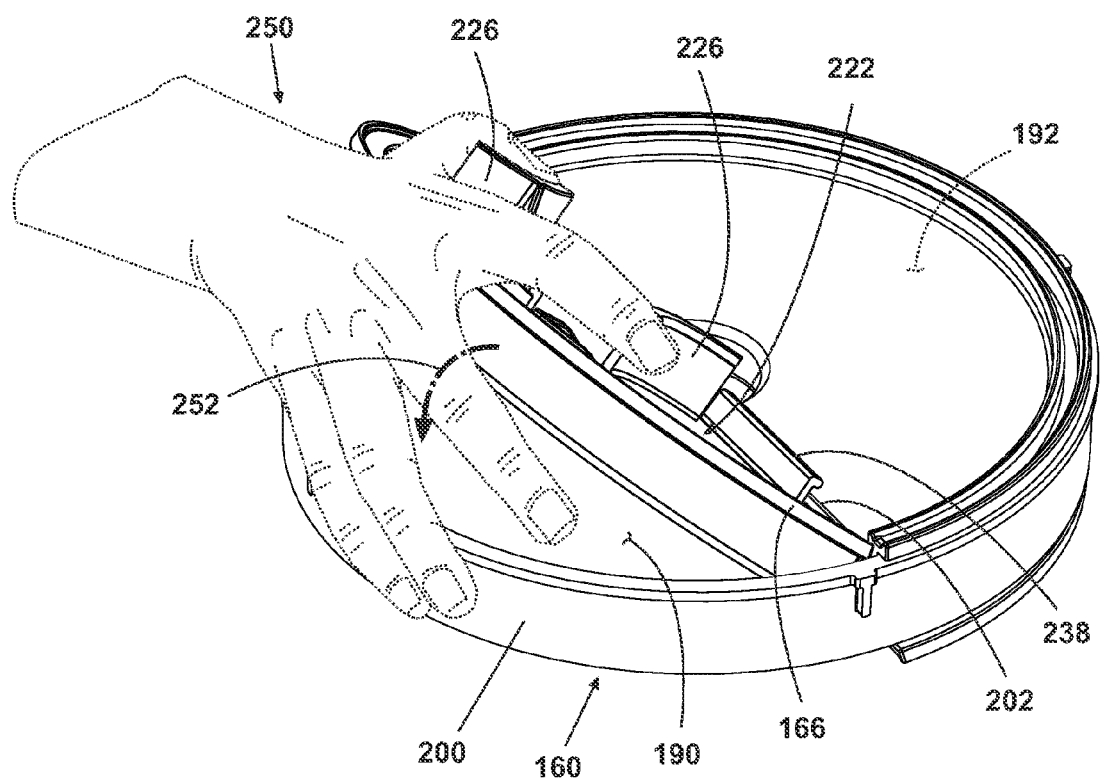
FIG. 11 is perspective view illustrating the use of a management tool to assemble a dicing tool according to a fourth embodiment of the invention.

Referring now to FIG. 11, a method for assembling the dicing element 140 for a food processing operation with the food processor 110 will now be described. Once the dicing element 140 is assembled, a food processing operation may be completed with the food processor 110 in a manner similar to that described for the food processor 10. Prior to using the dicing tool 140 with the food processor 110, the user places the desired dicing element, in this case the first dicing element 166, in the first compartment 190 of the frame 160. The user may place different dicing elements in the first compartment 190, the compartment which is within the food processing path 126, depending on the desired food processing operation. While the method is described in the context of using the first dicing element 166 in a food processing operation, it will be understood that the second dicing element 168 may be used in a similar manner.

The first management tool 222 may be coupled with the first dicing element 166 such that a user may handle the first dicing element 166 through the first management tool 222, minimizing the user's contact with the cutting elements 172. This facilitates safe and sanitary handling of the first dicing element 166. The first management tool 222 may be coupled with the first dicing element 166 by aligning the projections 230 with the dicing openings 174 and pressing the projections 230 into the dicing openings 174 until the fingers 236 on the coupling elements 234 engage the housing 194.

As illustrated in FIG. 11, a user 250 may grasp the first management tool 222, which is coupled with the first dicing element 166, by the handles 226 and place the inner portion 198 of the housing 194 of the first dicing element 166 in the first compartment 190, such that the retaining lugs 218 are received within the second apertures 216 in the interior wall 202. The user 250 may then press the outer portion 196 of the housing 194 downwards in the direction indicated by arrow 252 until the detent 214 of the first dicing element 166 snaps into the first aperture 212 on the frame 160. When assembled, the first dicing element 168 is supported within the first compartment 190 by the ledge 204 extending partially into the first compartment 190. In this manner, the user 250 may removably secure the first dicing element 166 within the first compartment 190 without contacting the cutting elements 172. It is also within the scope of the invention for the first dicing element 166 to be assembled with the frame 160 through a press-fit connection.

Prior to starting a food processing operation, the first management tool 222 may be removed by grasping the handles 226 and pulling the first management tool 222 in a direction upwards and away from the first dicing element 166 such that the fingers 236 of the coupling elements 234 disengage the housing 194. In the case of the first dicing element 166, this may be facilitated by pressing the tab 238 to disengage the fingers 236.

The assembled dicing tool 140 may then be placed within a lip 119 of the bowl 118 by placing it over the upper end 158 of the output shaft 116 such that the keys 162 on the frame 160 mate with a plurality of keyways 147 in the lip 119.

Alternatively, the first dicing element 166 may be placed in the first compartment 190 after the frame 160 is placed within the lip 119 and the first management tool 222 may then be removed.

Once the dicing tool 140 is placed within the lip 119 and the management tool 222 has been removed, the user may then place the cutting tool 120 on the upper end 158 of the output shaft 116. The user may then position the lid 122 on the bowl 118 and deliver food through the feed tube 124 into the bowl 118. Similar to as described above with respect to the food processor 10, the user may then activate a motor 114 causing a drive shaft 141, output shaft 116, and cutting tool 120 to rotate. The food may be pushed down to the cutting tool 120 using a food pusher 128 where the food then contacts the cutting blade 152, at which point it is sliced and then it is pushed by the ramp portion 154 through the dicing tool 140 and into the bowl 118. Depending on which of the first and second dicing elements 166 and 168 are in the food processing path 126, the dicing tool 140 may yield cubed or diced bits of food.

During the food processing operation with the first dicing element 166 as described above, the second dicing element 168 may be stored in the second compartment 192 along with the second management tool 224. In this manner, the dicing tool 140 may be used with minimal disassembly of the assembled dicing tool 140 and first and second management tools 222, 224 illustrated in FIG. 10. This facilitates ease of use for the user and minimizes opportunities for the dicing elements and/or management tools to get lost or misplaced.

When the food processing operation is complete, the first management tool 222 may again be coupled with the first dicing element 166 to remove food remaining within the dicing openings 174. As the first management tool 222 is coupled with the first dicing element 166, the projections 230 push any food remaining in the dicing openings 174 through the dicing openings 174. As illustrated in FIG. 10, the projections 230 are slightly longer than the depth of the dicing openings 174 such that when the first management tool 222 and the first dicing element 166 are coupled, the projections 230 extend past the edges of the cutting elements 172, effectively pushing food out of the dicing openings 174 and away from the cutting elements 172.

Figure 12:
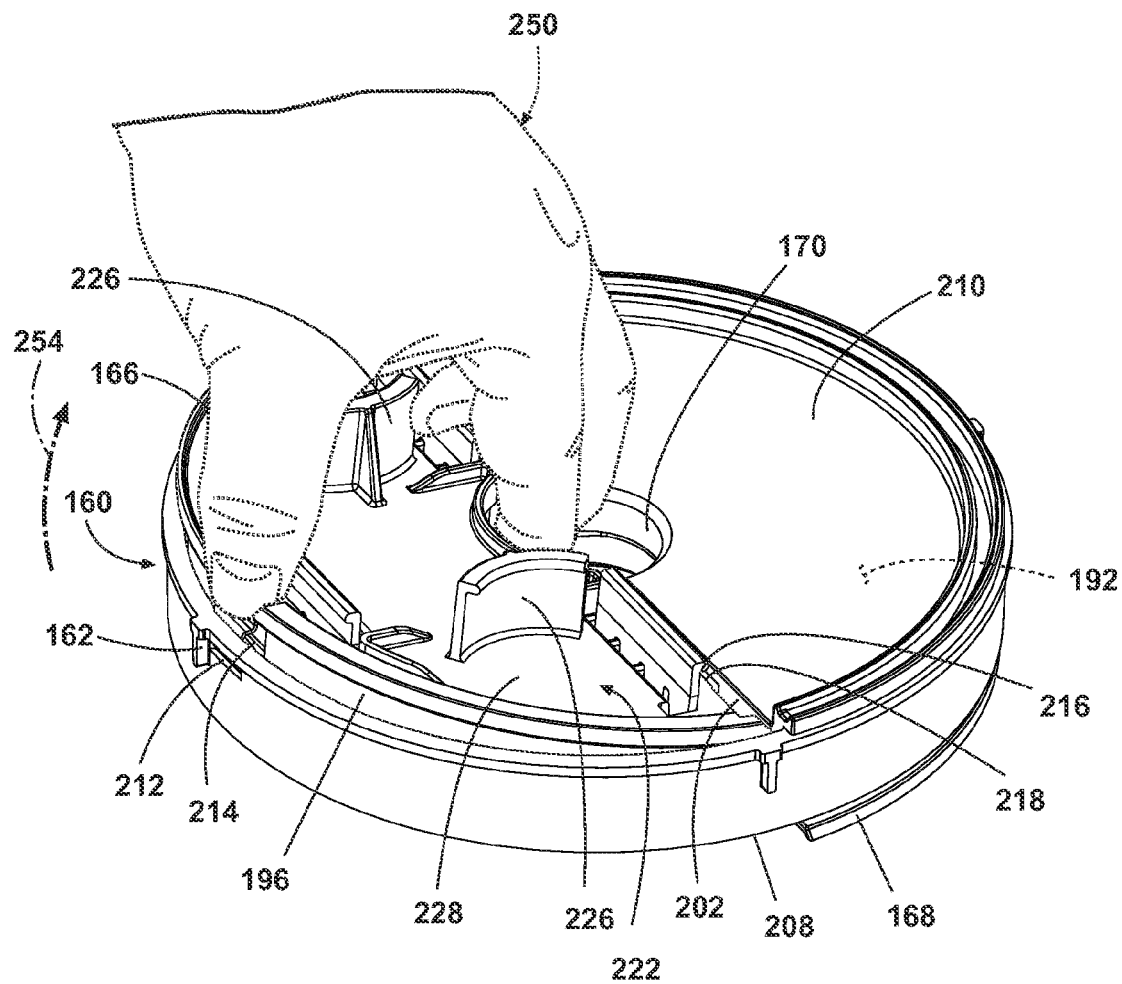
FIG. 12 is a perspective view illustrating the use of a management tool to disassemble a dicing tool according to the fourth embodiment of the invention.

If the user desires to use the second dicing element 168 in a food processing operation, the location of the first and second dicing elements 166 and 168 may be switched by placing the first dicing element 166 in the second compartment 192 and the second dicing element 168 in the first compartment 190, which is part of the food processing path 126. As illustrated in FIG. 12, to remove the first dicing element 166 from the first compartment 190, the user 250 may grasp the housing 194 of the first dicing element 166 at the inner portion 198 near the central opening 170, depress the detent 214 and lift the first dicing element 166 away from the first compartment 190 as illustrated by the arrow 254. The second dicing element 168 may be removed from the second compartment 192 in a similar manner and then placed in the first compartment 190 for use in a food processing operation in a manner similar to that described above for the first dicing element 166. The first dicing element 166 may be placed in the second compartment 192 for storage during a food processing operation with the second dicing element 168.

The first and second dicing elements 166, 168 may be removed from the first and second compartments 190, 192 while the first and second management tools 222, 224 are coupled with the first and second dicing elements 166, 168, respectively, as described above. However, the first and second management tools 222, 224 do not necessarily need to be coupled with the first and second dicing elements 166, 168 when removing them from the first and second compartments 190, 192.

After the completion of a food processing operation and subsequent cleaning of the first and/or second dicing elements 166, 168 used in the operation, the dicing tool 140 and first and second management tools 222 and 224 may be assembled as illustrated in FIG. 10 and placed in storage until the next food processing operation.

While the first and second management tools 222, 224 are described as facilitating cleaning and handling of the first and second dicing elements 166, 168, it is also within the scope of the invention for the first and second management tools 222, 224 to only facilitate either cleaning or handling. For example, the first and second management tools 222, 224 may only include projections 230, 242 having the coupling elements 234, 246 around the periphery of the first and second management tools 222, 224 for removably coupling with the first and second dicing elements 166, 168 for handling and switching the dicing elements 166, 168 between the first and second compartments 190, 192. Alternatively, the first and second management tools 222, 224 may only include the projections 230, 242 for removing food remaining in the dicing openings 174 following a food processing operation, which do not couple with the first and second dicing elements 166, 168 such that the management tools 222, 224 are not used to handle the dicing elements 166, 168.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention that is defined in the appended claims.

What is claimed is:

1. A food processor comprising:
a receptacle having an open top and configured to receive processed food;
a food guide configured to receive food for processing and having an opening that opens into the open top of the receptacle to at least partially define a food processing path from the food guide to the receptacle;
a frame having a first compartment aligned with the opening of the food guide when the frame is received by the open top of the receptacle such that the first compartment is located within the food processing path and a second compartment, adjacent the first compartment, which is unaligned with the opening of the food guide when the frame is received by the open top of the receptacle such that the second compartment is located out of the food processing path; and
at least one dicing element configured to be received by both of the first and second compartments and having multiple elements defining multiple dicing openings through which the food may pass;
wherein when the dicing element is received in the first compartment, the dicing element extends into the food processing path, between the food guide and the receptacle, to dice food passing through the food processing path, and when the dicing element is received in the second compartment, the dicing element is stored out of the food processing path.

2. The food processor of claim 1, wherein the frame is fixedly mounted to the receptacle.

3. The food processor of claim 2, wherein the receptacle comprises an open top bowl and the frame is mounted to the open top to fixedly mount the frame to the receptacle.

4. The food processor of claim 1, further comprising a management tool selectively receivable in the dicing openings to remove any food in the dicing openings.

5. The food processor of claim 1, further comprising a cutting tool selectively movable through the food processing path to cut food as it passes through the food processing path.

6. The food processor of claim 1, wherein the dicing element comprises a dicing grid with intersecting elements.

7. The food processor of claim 6, wherein the at least one dicing element comprises a first and second dicing element, each of which are configured to be received within the first and second compartments.

8. The food processor of claim 7, wherein the first dicing element has a first set of dicing openings and the second dicing element has a second set of dicing openings, different in size from the first set of dicing openings.

9. The food processor of claim 8, wherein the first set of dicing openings has a first shape and the second set of dicing openings has a second shape different from the first set of dicing openings.

10. The food processor of claim 8, further comprising at least one management tool having multiple projections sized to be received by at least one of the first or second dicing openings, and wherein the at least one management tool is selectively movable into at least one of the first or second dicing openings for removing food remaining in the at least one of the first or second dicing openings.

11. The food processor of claim 10 wherein the projections can be received by both the first and second dicing openings.

12. The food processor of claim 10 wherein the management tool comprises a handle to be grasped by a human hand to move the management tool to insert and remove the management tool from the first and second dicing openings.

13. The food processor of claim 1, wherein the at least one dicing element snap-fits into the first and second compartments.

14. A food processor comprising:
   a bowl terminating in an open top defined by a lip and at least partially defining a receptacle configured to receive processed food;
   a lid removably mounted to the bowl, with the bowl and lid collectively forming at least part of a housing in which the receptacle is located;
   a food chute having an opening that opens into the open top of the bowl to at least partially define a food processing path from the food chute to the receptacle;
   a frame mounted to at least one of the bowl or lid, the frame having a first compartment aligned with the opening of the food chute when the frame is mounted to the at least one of the bowl or lid such that the first compartment is located within the food processing path and a second compartment, adjacent the first compartment, which is unaligned with the opening of the food chute when the frame is mounted to the at least one of the bowl or lid such that the second compartment is located out of the food processing path; and
   at least one dicing element configured to be received by both of the first and second compartments and having multiple elements defining multiple dicing openings through which the food may pass;
   wherein when the dicing element is received by the first compartment, the dicing element extends into the food processing path, between the food chute and the receptacle, to dice food passing through the food processing path and when the dicing element is received by the second compartment, the dicing element is stored out of the food processing path.

15. The food processor of claim 14, further comprising a cutting tool selectively movable through the food processing path to cut food as it passes through the food processing path.

16. The food processor of claim 14, wherein the dicing element comprises a dicing grid with intersecting elements.

17. The food processor of claim 16, wherein the at least one dicing element comprises a first and second dicing element, each of which are configured to be received within the first and second compartments.

18. The food processor of claim 17, wherein the first dicing element has a first set of dicing openings and the second dicing element has a second set of dicing openings, different in size from the first set of dicing openings.

19. The food processor of claim 18, wherein the first set of dicing openings has a first shape and the second set of dicing openings has a second shape different from the first set of dicing openings.

20. The food processor of claim 18, further comprising at least one management tool having multiple projections sized to be received by at least one of the first or second dicing openings, and wherein the at least one management tool is selectively movable into at least one of the first and second dicing openings for removing any food remaining in the at least one of the first or second dicing openings.

21. The food processor of claim 20 wherein the projections can be received by both the first and second dicing openings.

22. The food processor of claim 20 wherein the management tool comprises a handle to be grasped by a human hand to move the management tool to insert and remove the management tool from the dicing openings.

23. The food processor of claim 14, wherein the at least one dicing element snap-fits into the first and second compartments.

* * * * *